(12) United States Patent
Christensen et al.

(10) Patent No.: US 7,305,438 B2
(45) Date of Patent: Dec. 4, 2007

(54) METHOD AND SYSTEM FOR VOICE ON DEMAND PRIVATE MESSAGE CHAT

(75) Inventors: James E. Christensen, Cortlandt Manor, NY (US); Zon-Yin Shae, South Salem, NY (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/730,782

(22) Filed: Dec. 9, 2003

(65) Prior Publication Data

US 2005/0144247 A1   Jun. 30, 2005

(51) Int. Cl.
*G06F 15/16* (2006.01)

(52) U.S. Cl. ............... 709/205; 709/204; 709/206; 709/227; 715/753; 715/758

(58) Field of Classification Search ........ 709/203–205, 709/227–228, 230, 206; 715/753, 758
See application file for complete search history.

(56) References Cited

U.S. PATENT DOCUMENTS

| 5,737,011 | A  | * | 4/1998  | Lukacs          | 348/14.09 |
|-----------|----|---|---------|-----------------|-----------|
| 6,175,619 | B1 | * | 1/2001  | DeSimone        | 379/202.01|
| 6,564,261 | B1 | * | 5/2003  | Gudjonsson et al.| 709/227  |
| 6,721,703 | B2 | * | 4/2004  | Jackson et al.  | 704/270   |
| 6,807,565 | B1 | * | 10/2004 | Dodrill et al.  | 709/227   |
| 6,931,114 | B1 | * | 8/2005  | Martin          | 709/204   |
| 7,039,040 | B1 | * | 5/2006  | Burg            | 370/352   |
| 7,039,675 | B1 | * | 5/2006  | Kato            | 709/204   |
| 7,047,030 | B2 | * | 5/2006  | Forsyth         | 455/518   |
| 7,111,044 | B2 | * | 9/2006  | Lee             | 709/204   |
| 2004/0221224 | A1 | * | 11/2004 | Blattner et al. | 715/500.1 |
| 2005/0102358 | A1 | * | 5/2005  | Gold et al.     | 709/204   |
| 2005/0128997 | A1 | * | 6/2005  | Zhao et al.     | 370/349   |

OTHER PUBLICATIONS

D. Farber, IP telephony meets instant messaging Enterprise, Mar. 30, 2003.

(Continued)

*Primary Examiner*—Philip Tran
(74) *Attorney, Agent, or Firm*—Scully, Scott, Murphy & Presser, P.C.; Derek S. Jennings

(57) ABSTRACT

A system and method for establishing a private message chat between electronic devices. The method includes steps of providing an indication as to the availability of a user for receiving a private message chat; receiving an audio input message from at least one first client; and transmitting the audio input message to at least one second client over a communications network, wherein the at least one second client can receive, temporarily store and play back the audio input message. The first client may receive a reply audio input message from the at least one second client or, receive a reply text input message from the at least one second client, and subsequently may further communicate back to the second client device via one of audio or text messaging, according to that user's discretion. The transmitting of any audio input message may be accomplished via VoIP or SIP.

22 Claims, 4 Drawing Sheets

OTHER PUBLICATIONS

"Siemens Enterprise Workgroup Collaboration Strategy and Development Directions Presence-based, Real-time, Multi-resource Communications", Siemens Information and Communication Networks, Inc., 2003, pp. 1-4.

"OpenScape Real-time, Presence-based, Multi-resource Communications The Problem: GATU", Siemens Information and Communication Networks, Inc., 2003.

"OpenScape Real-time, Presence-based, Multiresource Communications", Siemens Information and Communication Networks, Inc., 2003.

"OpenScape Data Sheet Suite for Real-Time Communication and Collaboration", Siemens Information and Communication Networks, Inc., 2003.

* cited by examiner

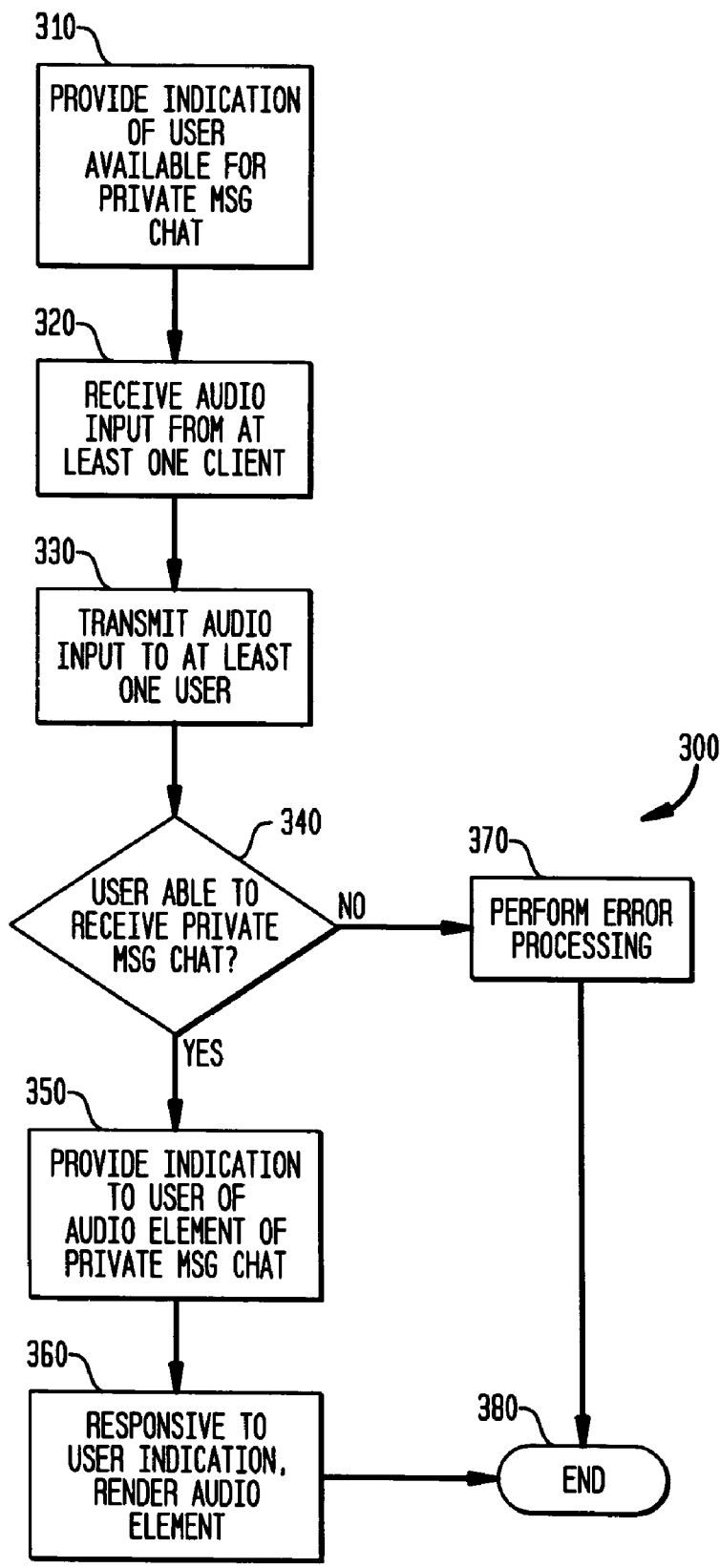

METHOD AND SYSTEM FOR VOICE ON DEMAND PRIVATE MESSAGE CHAT

BACKGROUND OF THE INVENTION

1. Field of the Invention

The present invention relates generally to systems and methods of non-synchronous communication and, particularly to a system and method for voice on demand elements of private message chats, where end users may elect the modality of their chat communication for each receipt of a message, and each response.

2. Description of the Prior Art

Traditional telephony allows a variety of calling paradigms including: one to one (regular call), one to many (party line on receiving side), and many to many (conference call). Each conversation traditionally requires a circuit, and the call flow follows the path of call request (dial), call setup, call accept (on the receiver side), cut through and conversation. When one party hangs up the call is terminated. Call setup often involves a long time, up to 30 seconds, and the nature of the telephone switch prevents rapid call termination/initiation. When one party hangs up and then attempts to reinitiate a call to the same number, the line is often still busy, and it is necessary to wait until it clears before completing the call.

Voice over Internet Protocol (VOIP) technologies provide packet based voice replacements for traditional telephony. Many novel approaches are possible to initiate calls, such as click-to-call on web sites (used for help desk coverage, among other things). VOIP can provide the same functions—conferencing, long distance, etc. as traditional voice telephony.

In conventional Internet "chat" environments, text conversations via computing devices are held in a semi-synchronous fashion. The chat environment is a chat room, e.g., a Web site, part of a Web site, or part of an online service such as America Online, that provides a venue for users with a common interest to communicate in real time. Unlike forums and discussion groups, chat services have the capacity for interactive messaging and do not require users to have any special software. Internet Relay Chat, which is a system for chatting that involves a set of rules and conventions, does require client/server software, which is capable of being downloaded from the Internet. Chat room users register for a chat room, choose a user identification and password, and log into that particular room. Inside the chat room, generally there is a list of the people currently online, each of whom also are alerted that another person has entered the chat room. To chat, users type a message into a text box and the message is virtually immediately rendered visible in a larger display area so that other users may now respond.

FIG. 1 illustrates a conventional chat system 100. In the chat system 100 depicted in FIG. 1, elements 110 and 140 represent chat client devices physically embodied as a server, a personal computer (PC), a personal digital assistant (PDA), a cellphone or other like computing device. Examples of capable non-personal computer devices include Blackberry devices (available at www.blackberry.com) and AOL which provides Instant Messaging (IM) service for cellphones (http://mymobile.aol.com/portal/im/index.html). Elements 110 and 140 need not represent equivalent devices (e.g., need not both be personal computers), as long as each is capable of providing the infrastructure of a chat client. Generally, devices must have the ability to accept chat input, and to display chat output. Software providing the chat function for devices 110 and 140 may be resident locally, or may be provided as a service by a remote server (not shown). Remote servers providing such software may be different for different clients (e.g., devices 110 and 140 may be served by different remote software servers). As shown in FIG. 1, chats in progress result in text transcripts 120 and 150 that generally provide an indicator of the source of a chat statement (e.g., a nickname for whomever entered the statement), and a textual transcript of the chat statement itself. These are often provided in a window that maintains the sequential nature of the interchange, and provides the visual frame associating all the messages. Elements 110, 140 and a network-based chat service 180 are shown interconnected via a communications network 170 which may comprise a single network, or a set of interconnected networks including links which may be wireless, wireline, broadband and narrowband, and may include the Internet in general. Chat system 100 additionally include elements 130 and 160 that let chat clients speak to one another via network 170 in a manner much like the experience provided by a telephone call. Elements 130 and 160 particularly enable a client to speak to the other chat client, and hear what the other chat client has said. An example of an audio-capable client device is a personal computer with a microphone and speaker either built in or added on. In addition to the basic textual chat system described above, an audio-capable system requires software for interfacing to the speaker and microphone, encoding and decoding the audio data, a protocol for exchanging the audio data between client devices, and a network 170 with sufficient capacity and bandwidth to send and receive audio data at a rate consistent with spoken conversation. It should be understood that conventional chat systems treat audio and textual data differently. While transcripts 120 and 150 provide a chronological history of the textual messages exchanged in the chat session, they do not include audio data. Audio data is sent from the originating client, and played at the receiving client as it would during a telephone call that was not being recorded.

Through chat embodiments such as Lotus Sametime (an instant messaging and Web conferencing solution for businesses) and AOL Instant Message, individuals may engage in lightweight text interchanges with: 1) minimal overhead to start, 2) minimal expectations as to length of message, persistence, acknowledgement, 3) minimal requirements for rapid response on the part of the recipient. Chat is a conversation, but not a real time conversation (i.e., not synchronous). The sender expects a response, but not necessarily right away. However, unlike e-mail and voicemail, there's an expected thread of continuity between interchanges, presented visually with the ability to display the whole of the interchanges within one chat window per conversation. Such chats may generally be held concurrently, allowing an individual to communicate with many people at once on different topics.

Current e-mail systems now enable the addition of voice elements. For example, audio file formats such as *.wav which are digital audio captured in a file, may now be appended as an attachment to e-mail. It is well known in the art that one can attach audio files to e-mail messages, which may subsequently be played by the recipient at his location. A unified messaging system (e.g., see http://www.iec.org/online/tutorials/unified_mess/) uses this kind of communication to move voice mails around in a fully asynchronous manner. The "Notes Buddy" tool for Lotus Notes™ is an exemplary embodiment that integrates instant messaging (chats) and buddy status with e-mail to produce a single messaging tool. With notes buddy, one can use voice to input to a Notes e-mail which is sent to recipient and appears as a *.wav file attachment to a regular email. Notes buddy also allows a user to play out his/her regular e-mail via text to speech conversion. It is noted that this program provides Lotus Sametime status in conjunction with the mail. Generally, however, an e-mail is sent and received without knowledge of the current availability or willingness of the other party to attend to the e-mail.

AOL, MSN and Lotus Sametime provide the ability to conduct synchronous voice communications. These are fully synchronous "open mike" applications and do not allow any voice exchange that is not synchronous. These applications provide two parallel communications methods—one for text chat and one for synchronous voice. They do not provide semi-synchronous voice, nor the ability to store the voice utterances.

Thus, in sum, today's telephone communication paradigm requires a connected circuit, a call-flow path of call request (dial), call setup, call accept (on the receiver side), cut through and conversation. When one party hangs up the call is terminated. While VOIP does not require a circuit, calls made with VOIP follow the same stringent paradigm, and imply a dedicated listener. While VOIP is now generally used as a replacement for voice telephony, it would be highly desirable to enable means for voice communications that does not require a dedicated listener. Further, while e-mail communications permit audio file attachments enabling asynchronous transmission of voice, it does not allow conversational use of voice on demand. It would thus be highly desirable to provide a means for adding voice on demand elements to data communication systems.

As text chat is very much a hands on, eyes on communication method that does not allow for the ready capture of nuance as does voice. It would further be desirable to provide a "hands off", "eyes off" version of chat that includes the provision of means for capturing and transmitting nuance as enabled with voice communications.

SUMMARY OF THE INVENTION

A method and system of the invention enables semi-synchronous voice, for applications such as chat. By breaking away from the traditional telephony call paradigm, a user of the system and method of the invention is enabled to speak to a device with an active chat window, and expect that the recipient of the chat will be able to hear the voice chat semi-synchronously. The recipient may then respond in a manner of his/her choice, including text chat, voice conversation, or, no response. The invention enables an individual to have conversation that ranges through a spectrum from fully synchronous to fully asynchronous, with the ability to alter the mode at any time. This conversation may be with one or more other individuals or may be with an IT process that uses TTS (text-to-speech)/voice recognition as the output/input mechanisms.

In the present invention, a user (first party) of Voice On Demand For Private Message Chat (VODPMC), may speak to a device with an active chat window, and expect that the recipient of the chat will be able to hear the voice chat semi-synchronously. The recipient then may respond in a manner of his or her choice, including text chat, VODPMC, voice conversation, or no response. Note that the first party user does not have the ability to eavesdrop on the recipient, and in fact may not expect to hear anything at the time of the message.

The present invention further enables an individual to have a conversation that ranges through the spectrum from fully synchronous to fully asynchronous, from text to voice on demand, with the ability to alter the mode at any time. This conversation may be with one or more other individuals or may be with an IT process that uses TTS/voice recognition as the output/input mechanisms.

According to the invention, there is provided a system and method for establishing a private message chat between electronic devices. The method includes steps of providing an indication as to the availability of a user for receiving a private message chat; receiving an audio input message from at least one first client; and transmitting the audio input message to at least one second client over a communications network, wherein the at least one second client can receive, temporarily store and play back the audio input message. The first client may receive a reply audio input message from the at least one second client or, receive a reply text input message from the at least one second client, and subsequently may further communicate to the second client device via one of audio or text messaging, according to that user's discretion. The transmitting of any audio input message may be over a wired connection (Internet) or a wireless connection.

Advantageously, the system for voice chat according to the invention may employ biometric devices to order to authenticate or provide a confidence factor that the person identified as communicating with a user of client device, is in fact the person identified.

BRIEF DESCRIPTION OF THE DRAWINGS

Further features, aspects and advantages of the structures and methods of the present invention will become better understood with regard to the following description, appended claims, and accompanying drawings where:

FIG. 3 is a flow chart depicting the methodology for implementing VODPMC of the invention; and, FIGS. 4(a)-4(c) depict an exemplary user interface for implementing VODPMC according to the invention.

DETAILED DESCRIPTION OF THE PREFERRED EMBODIMENT

The present invention is directed to a semi-synchronous voice chat system. Referred to herein as Voice On Demand for Private Message Chat (VODPMC), the system and method provides a break from the traditional telephony call paradigm.

Figure 1:
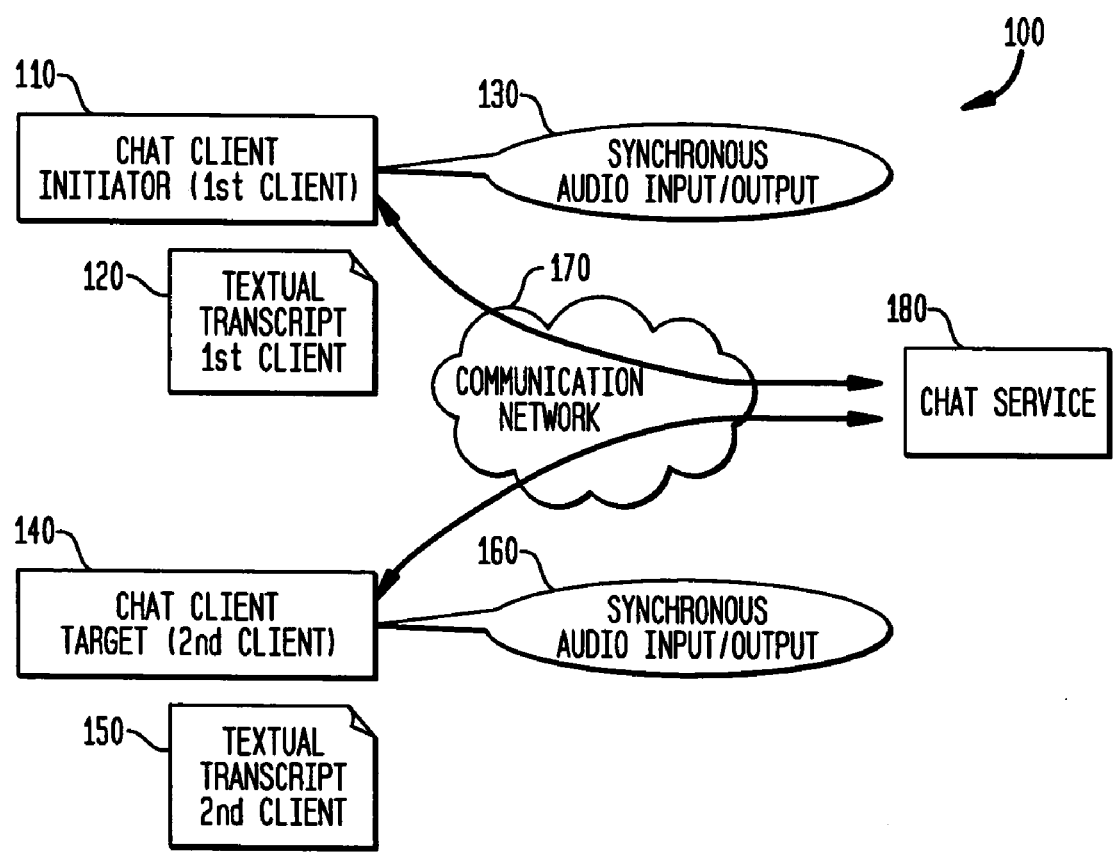
FIG. 1 depicts a conventional chat system.
Figure 2:
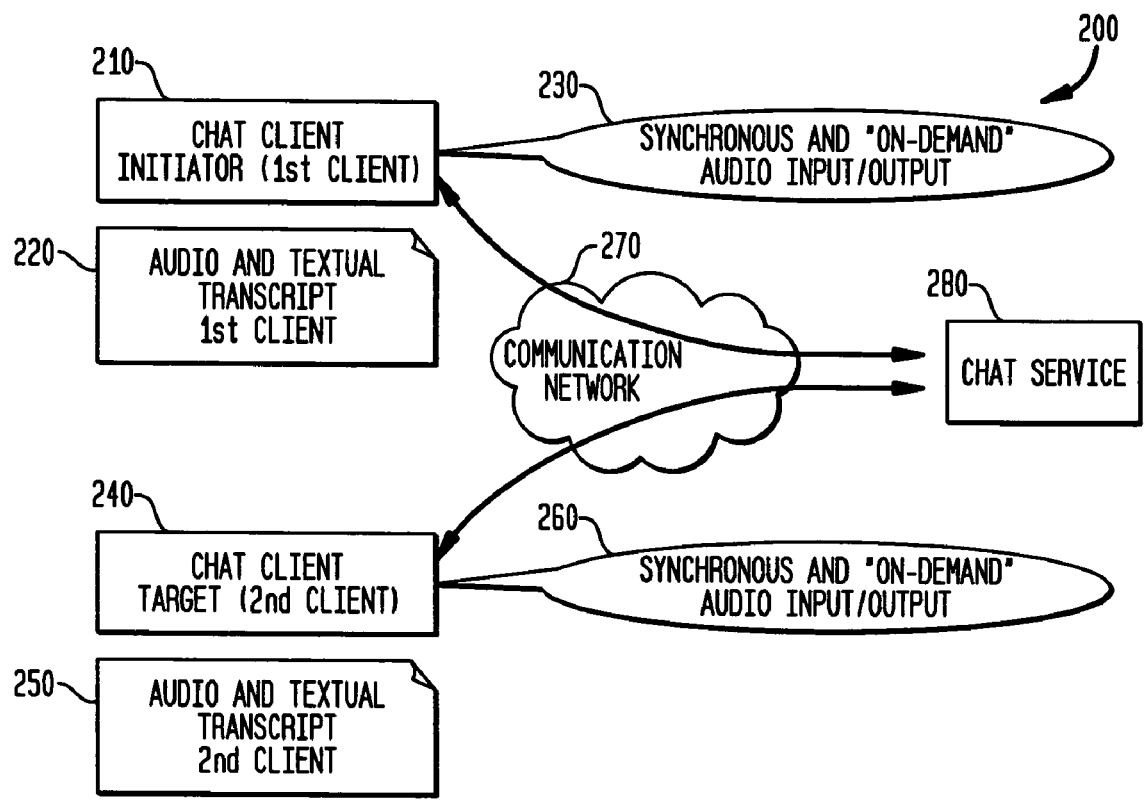
FIG. 2 depicts the VODPMC chat system 200 of the invention.

FIG. 2 depicts the VODPMC chat system 200 of the invention. In the inventive system 200, elements 210 and 240 represent chat client devices within chat system 200, and element 280 provides the network-based chat service. As in conventional chat systems, elements 210 and 240 may physically represent a server, a personal computer (PC), a personal digital assistant (PDA), a cellphone or other computing device. Examples of capable non-personal computer devices include Blackberry devices (www.blackberry.com). AOL provides an Instant Messaging (IM) service for cellphones (http://mymobile.aol.com/portal/im/index.html). Devices 210 and 240 need not represent equivalent devices (e.g., need not both be personal computers), as long as each is capable of providing the infrastructure for a chat client. Software providing the chat function for elements 210 and 240 may be resident locally, or may be provided as a service by a remote server (not shown). Remote servers providing such software may be different for different clients (e.g., elements 210 and 240 may be served by different remote software servers). Element 280 may be a single server machine, a static or dynamic collection of machines performing the server function, or may be co-located on one or both of the machines serving as chat clients. Elements 210, 240, 280 are adapted for connection to each other via a communications network 270 which may comprise a single network, or a set of interconnected networks including links which are wireless, wireline, broadband and narrowband, and may include the Internet, in general.

The chat system 200 of the invention additionally provides elements that enable chat clients to speak to one another in the style of communication provided by text-only IM systems. The elements that provide the basic audio input and output capability are elements 230 and 260, and they allow a client to store and send an audio message to the other chat client, and for either chat client to playback audio messages. An example of an audio-capable client device is a personal computer with a microphone and speaker either built in or added on. Such an audio-capable client device includes software for interfacing to the speaker and microphone, encoding and decoding the audio data, for detecting the start and end of an audio message, and a protocol for exchanging the audio data between clients and, additionally includes a device to store and replay the audio data, and interface with a network 270. It is understood that the capacity and bandwidth of network 270 is not required to enable the sending and receipt of the audio data at a rate consistent with real-time spoken conversation. As the audio data is stored and replayed at both clients, the network 270 may deliver the audio at any rate that can be supported.

It is understood that audio transmission may be accomplished using Voice Over IP (VOIP), IP telephony, or SIP (Session Initiation Protocol) which is a signaling protocol for Internet conferencing, telephony, presence, events notification and instant messaging. SIP particularly is an Internet Engineering Task Force (IETF) standard protocol for initiating an interactive user session that involves multimedia elements such as video, voice, chat, gaming, and virtual reality. It particularly provides the necessary protocol mechanisms so that end systems and proxy servers can provide voice telephony services including, but not limited to: call forwarding, callee and calling "number" delivery, where numbers can be any (preferably unique) naming scheme; caller and callee authentication; blind and supervised call transfer; invitations to multicast conferences; and, extensions of SIP to allow third-party signaling.

The chat system 200 of the invention additionally enables all textual and audio messages to be saved in chat transcripts 220 and 250. Either chat client 210, 240 may re-read or re-play any message on demand. Such transcripts generally provide an indicator of the source of a chat statement (e.g., a nickname for whoever entered the statement), and, a textual transcript of the chat statement itself. For audio messages, voice recognition technology may be provided to generate an approximation of the audio content, or an iconic representation of the audio message which may be displayed along with information about the audio message (for example, the duration of the message). These transcripts are provided in a window or similar interface that maintains the sequential nature of the interchange, and provides the visual frame associating all the messages.

It is understood that the system 200 of the invention may be used even when element 230 or 260 (but not both) are absent from the system. Those skilled in the art will recognize that speech recognition technology may be used to map audio messages into text, and that text to speech technology may be used to map text messages to audio.

The system 200 may further be used in systems where one or both clients lacks the ability to enter textual messages, but has the ability to provide for chat transcripts 220 or 250 as described hereinabove. Examples of such chat clients include small mobile devices with ample capacity for audio data, but limited space for textual input entry and reading textual output. Current cell phone devices provide this capability, and it is expected that future cell phones will as well.

FIG. 3 is a flow chart depicting the methodology for implementing the VODPMC system of the invention. In a first step 310, an indication is generated for display on a client device to represent user availability for a private message chat. Such an indication may include, but is not limited to: an indication of presence, an indication of availability, an e-card providing a channel for a private message chat; a text element, a graphic element, an icon, a color, or a texture. Existing systems adapted to provide such indications include Lotus Sametime (presence), and AOL IM. An "e-card", such as described in commonly-owned, co-pending U.S. patent application Ser. No. 036,194 entitled SYSTEM AND METHOD FOR PROVIDING ACCESS AND UTILIZATION OF CONTEXT INFORMATION, and in commonly-owned, co-pending U.S. patent application Ser. No. 10/624,107 entitled COMMUNICATION CAPABILITY COUPONS is adapted to display multiple channels that are available for communications and which among these channels are available at a current time. An indication of availability may include, but is not limited to: indications of willingness, indications of preference for communication, or indications of calendar availability. The whole contents and disclosures of commonly-owned, co-pending U.S. patent application Ser. Nos. 036,194 and 10/624,107 are incorporated by reference as if fully set forth herein. At the completion of step 310, a potential user of voice on demand private message chat is aware that a second user is available. Thus, the sender has knowledge via this availability indicator that the recipient is available to receive a semi-synchronous voice chat message now and may expect an imminent response. It should be understood that certain client devices may be utilized by users who cannot use their hands to communicate via client devices of the VODPMC system. An example of such a user is a driver of an automobile who must communicate by "hands free" communications means. Thus, in an alternate embodiment, an audible indication may be provided to a user to indicate the availability of a second user for receiving voice on-demand messages.

Proceeding next to step 320, FIG. 3, there is depicted a step of receiving audio input from a client. The client may receive the audio through a microphone, through a network connection, or other means. For instance, a wireless network implementing Bluetooth or like wireless communications protocol from a wireless connected peripheral may be employed.

As depicted at next step 330, audio is transmitted to at least a second user for storage thereat. This audio may be transmitted directly to the second chat client, by wireless or wired network connection, or may be transmitted through an intermediate network such as the Internet. It is understood that, alternately, the audio input may be stored at the chat server 280 (FIG. 2) until accessed by the second chat client. Regardless, this audio may or may not traverse an intermediate application or chat processor. If the audio traverses an intermediate processor, then the intermediate processor may provide additional function such as conferencing, language translation, audio transformation, transcription or other service.

Next, at step 340, FIG. 3, there is depicted the step of determining whether the user is able to receive a private message chat. Despite the indication of availability in step 310, it may be that the at least one second user cannot receive a chat. The second user may have inadequate hardware, may have experienced reception difficulty due to wireless or wired network outage, or may have signaled a subsequent unavailability to receive the private message chat. If the decision is that the user cannot receive a private message chat, then the process proceeds to step 370 to perform error processing. Following step 370, the process ends at step 380.

Returning to step 340, if it is determined that the user could receive a private message chat, the process proceeds to step 350, where an indication is provided to the at least one second user of the audio element of the private message chat, i.e., a voice on demand element. This indication may include but is not limited to: an audio indication such as a bell, a visual indication such as a blinking light, a text indication, a graphic indication, a color indication, a texture indication, or a displayed icon.

Next, at step 360, the audio element is rendered responsive to an indication from the at least one second user. Such indication may include but is not limited to: a preference, a profile, a keystroke, a voice command, a touch screen action, a button press, a motion, or a gesture. A voice on demand private message chat is now established, and the second client user may now respond by voice and/or text. The process then terminates at step 380. It should be understood that in an example of a "Hands free" chat session, the second user may render response messages as audio input for receipt by a first client device for receipt by a driver of an automobile.

Illustrative examples of the VODPMC of the invention are now provided. In each example, close collaboration between two parties is enabled using a chat application capable of VODPMC in addition to textual messages and fully synchronous voice communication, and which provides a user interface indicating communication channel(s) available from one party to another, along with availability.

In a first example, a VODPMC one-way session is established between two parties that includes an initial audio communication, e.g., of a user's voice. The VODPMC-capable application provides an interface and enables Joe to speak without further action, but does not allow him to listen. Jane likes to work at the board, and often does not pay attention to her PC. She ignores all the IM beeps. Joe has an important question, so he clicks on Jane's e-card to establish the one-way session and says "Jane—can you talk for a minute?". The voice is transmitted to Jane's (client) device via a wired connection, e.g., VOIP, or a wireless connection, e.g., RF communication, rendered as audio, and stored as an audio file or as an in-memory temporal audio object for subsequent replay at Jane's (client) device. If Jane is in the room, and has enabled VODPMC sessions from Joe to be rendered (played out loud) as soon as they arrive at her client, she hears Joe, and can click a button or icon enabling fully synchronous voice communication—this action will permit Joe to hear as well as speak, and they converse. Thus, in this first example, the inventive system and method establishes a VODPMC one-way session with Jane's system, allowing him to speak effortlessly to her in response to Joe's click of her e-card. At first, Joe cannot hear Jane (to ensure her privacy) without a specific action by her allowing it. It is understood that, in this example, the verbalization is logged and a visual indication is provided on the VODPMC-capable application interface that something new is there. If Jane was out of the room, or had not enabled the rendering of audio upon receipt, then she eventually comes back, and/or notices that something new is there, clicks on the communication request and the logged verbalization is played back. In this case, the audio is VODPMC.

Figure 4C:
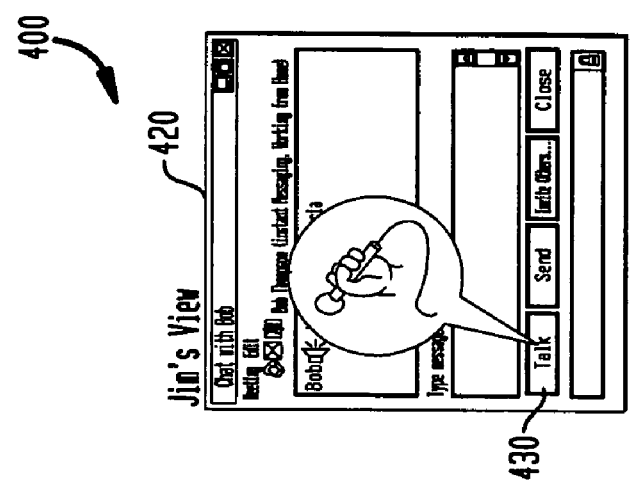
Figure 4B:
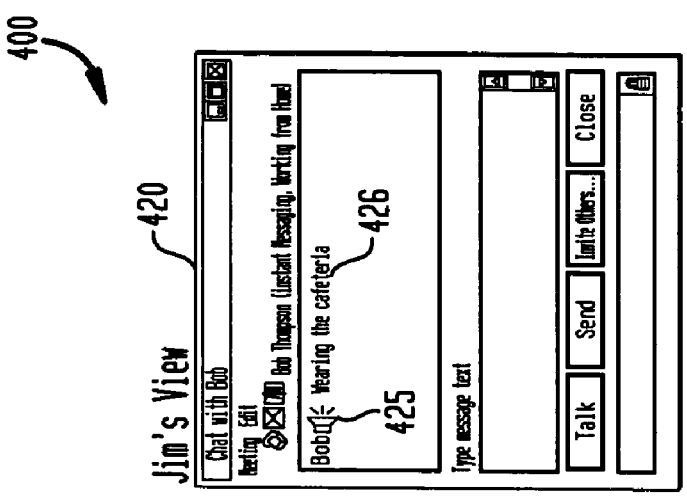
Figure 4A:
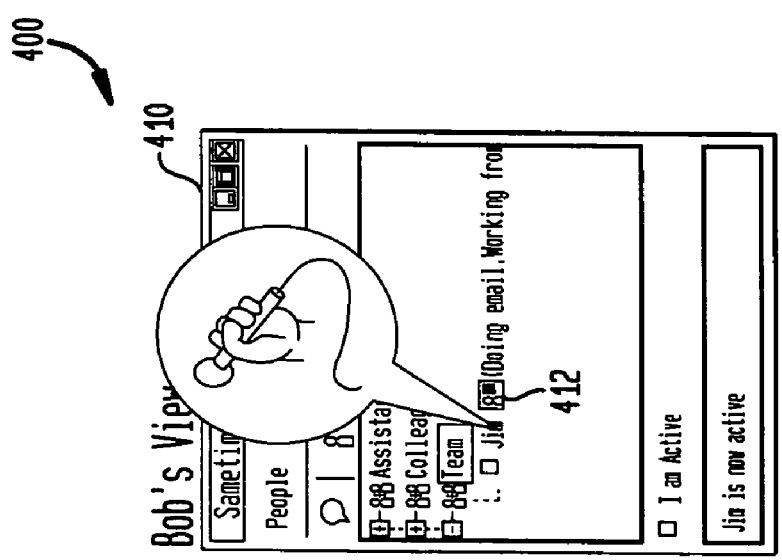

A second example implementing the system and method of the invention is depicted in FIGS. 4(a)-4(c). In this example of VODPMC 400 shown in FIG. 4(a), a session is established between two parties in which the second party does not hear the initial audio message at the time it's received. In a first step, Bob's VODPMC-capable chat interface 410 provided at his client device indicates that Jim is presently on-line and available for a VODPMC request. At step 412 Bob clicks on Jim's name (or an iconic representation thereof), and says "We're in the cafeteria". The voice is transmitted to Jim's (client) device via a wired connection, e.g., VOIP, or a wireless connection, e.g., RF communication, and the verbalization is rendered as audio and stored as an audio file (or, as an in-memory audio object) for subsequent replay via Jim's (client) device. As shown in FIG. 4(b), Jim, via his VODPMC-capable chat interface 420 provided via his client device, sees an indicator 425 that there's an audio element to the chat message. Optionally, a version of what Bob had recited is transcribed through a voice recognition unit at Jim's client device or the network chat server, and additionally indicated as text message 426 via the interface 420. Depending upon Jim's circumstance or preference, he may choose to listen to the audio, (e.g., if he is not in a customer meeting), or, can simply use the voice recognized transcribed version. Jim now can decide how to respond—either with synchronous voice, a VODPMC, or with text. The example depicted in FIG. 4(c) indicates a selection 430 via Jim's interface for enabling a VODPMC or synchronous voice response back to Bob.

In these examples, when these VODPMC-capable chat (interface) windows are closed, the chat, including the indications of audio elements, disappears. If the recipients did not listen to the audio elements, they no longer have the option to do so.

It should be understood that a "Hands free" VODPMC chat session may be established according to the invention whereby one party via a first client device communicates by voice and the second client responds by text, using text to speech (TTS) for rendering. This may be advantageous for a driver implementing a first client device who is unable to chat via text messaging. This client (a driver in an automobile) may first indicate his availability to receive synchronous voice or VODPMC. Subsequently, another party desirous of communicating with the driver may initiate VODPMC communications, or may respond by text messaging, if voice is not available. In the instance voice response is not available, the driver's client device or network chart server will employ a TTS feature for receiving and playing voice messages from any text message communicated by the other party.

It should be further understood that the system for voice chat according to the invention may employ biometric devices in order to authenticate or provide a confidence factor that the person identified as communicating with a user of client device, is in fact the person identified. As known to skilled artisans, more sophisticated biometric analysis systems may be incorporated, for instance, to ascertain emotional status of a communicating party, e.g., via employed heart-rate sensors, voice tonal quality analysis, keyboard force sensors, etc.

It is further understood that the system for voice chat according to the invention may be oriented for multiple modes of use, i.e., a user (recipient) may employ two client devices: e.g., a Personal Digital Assistant (PDA) and a cell phone. In such implementation, a user may receive audio on the first device (e.g., cell phone), yet reply via his/her PDA.

Further to this, it is understood that a user, in a single chat session, may employ both voice and text in communications. That is, the use of voice and text may be interleaved throughout a single chat session, with the user, for example, using text response messaging or voice response, depending upon the communication circumstances, e.g. user environment.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A method for establishing a voice on demand private message chat between first and second client devices adapted for communicating via a text chat session, the method comprising the steps of:
   at a first client device:
   providing an indication as to the availability of a second client device for receiving a voice on demand private message chat;
   selecting said second client;
   receiving an audio input message from a user of said first client device; and,
   responsive to said selecting, transmitting said audio input message to said second client device, and,
   at said second client device:
   receiving said audio input message and temporarily storing said received audio input message for access by a user of said second client device; and,
   providing an indicator that said audio message has been received from said first client, said indicator integrated with text received from said first client device; and
   rendering said audio input message,
   wherein either said first or second client device is enabled to select either an audio reply enabling audio reply or a text response mode enabling textual message reply from a single client device in a single chat session, whereby voice and text communications are interleaved in a single chat session such that said second client device can receive and play back said audio input message via said private message chat without interrupting said text chat session.

2. The method as claimed in claim 1, further comprising the step of:
   receiving, at said first client device, a reply audio input message from said second client.

3. The method as claimed in claim 1, further comprising the step of:
   receiving, at said first client device, a reply text input message from said at least one second client device.

4. The method as claimed in claim 1, wherein said step of transmitting said audio input message includes voice over Internet Protocol transmitting.

5. The method as claimed in claim 1, wherein said step of transmitting said audio input message includes transmitting via SIP.

6. A method for establishing a voice on demand private message chat between electronic devices used by a plurality of users and adapted for communicating via a text chat session, the method comprising the steps of:
   providing an indication as to the availability of at least one user from said plurality of users for receiving a voice on demand private message chat;
   selecting a user of said plurality of users;
   receiving an audio input message from a first user; and
   transmitting said audio input message to said at least one user of said plurality of users, and,
   at said at least one user:
   receiving said audio input message and temporarily storing said received audio input message for access by said at least one user; and,
   providing an indicator that said audio message has been received from said first user, said indicator integrated with text received from said first user; and
   rendering said audio input message,
   wherein said at least one user from said plurality of users is enabled to select either an audio reply enabling audio reply or a text response mode enabling textual message reply from a single electronic device in a single chat session, whereby voice and text communications are interleaved in a single chat session such that said at least one user from said plurality of users can receive and play back said audio input message via said private message chat without interrupting said text chat session.

7. A system for providing a voice-based communications chat session comprising:
   a first chat client device adapted to send and receive at least one audio message via a communications network;
   a second chat client device adapted to send and receive at least one audio message via a communications network;
   host server means in communication with said first and second chat client adapted to provide an indication as to the availability of the second chat client device for receiving a voice on demand private message chat via said communications network, for receiving an audio input message from a first chat client device destined for said user of said second chat client device, and, for transmitting said audio input message to said second chat client device via said communications network;
   means for storing said audio input message, and,
   means for providing an indicator that said audio message has been received from said first chat client, said indicator integrated with text received from said first user; and
   means for rendering said audio input message,
   wherein either said first chat or second chat client device is enabled to select either an audio reply enabling audio reply or a text response mode enabling textual message reply from a single chat client device in a single chat session, whereby voice and text communications are interleaved in a single chat session such that a user of said second chat client device is enabled to receive said audio message from said storage means via said private message chat without interrupting said text chat session.

8. The system for providing voice-based communications as claimed in claim 7, wherein said means for storing said audio input message resides in said host server means.

9. The system as claimed in claim 7, further including means provided at said at least one host computer for enabling transmission of said audio input message via VOIP.

10. The system as claimed in claim 7, further including means provided at said at least one host computer for enabling transmission of said audio input message via SIP.

11. A system for voice chat comprising:
a first client device comprising:
   a means for receiving indication of the availability context of a second client device for receiving a voice on demand private message chat via a chat interface,
   a means for selecting said second client device via said chat interface,
   a means for receiving an audio message input from a user of said first client device, and,
   a means for transmitting said audio message in response to said means for selecting said second client device; and,
said second client device comprising:
   a means for indicating availability context to said first client device;
   a means for receiving said transmitted audio message and storing said audio message;
   a means for providing an indicator that said audio message has been received from said first client device, said indicator integrated with text received from said first client device; and,
   a means for playing said audio message, wherein either said first or second client device is enabled to select either an audio reply enabling audio reply or a text response mode enabling textual message reply from a single client device in a single chat session, whereby voice and text communications are interleaved in a single chat session enabling playing of said audio message without interrupting a text chat session.

12. The system for voice chat as claimed in claim 11, further comprising:
a host computer device including:
   a means for determining availability status of said second chat client device for receiving a private message chat and providing an indication to a first client device as to the availability of said second chat client device to receive an audio input message;
   a means for receiving an audio message input from said first client device and transmitting said audio input message to said second chat client device.

13. The system for voice chat as claimed in claim 11, wherein said first and second client device further comprises voice recognition means for transcribing received audio messages into textual information and integrating said textual information received from said first client device in a message chat session between users of said first and second devices.

14. The system for voice chat as claimed in claim 13, wherein said second client device further comprises an interface means for enabling user selection of an icon for rendering said received audio message.

15. The system for voice chat as claimed in claim 14, wherein said second client device further comprises means for selecting a textual response mode and enabling text reply in response to received audio message.

16. The system for voice chat as claimed in claim 14, wherein said second client device further comprises means for selecting an audio response mode and enabling an audio reply in response to received audio message.

17. The system for voice chat as claimed in claim 14, further including means for generating biometric information associated with a user of said first client device, wherein said means for transmitting said audio, responsive to said means for selecting said second client device, further includes transmission of biometric information.

18. The system for voice chat as claimed in claim 14, wherein a first or second client device includes one or more devices, a first of said one or more devices enabling only audio communication and a second of said one or more devices enabling textual communication.

19. The system for voice chat as claimed in claim 18, wherein a first or second client device comprises one or more of a personal computer, a PDA, and a cell phone device.

20. A method for semi-synchronous voice chat comprising:
   indicating availability context of a user of a second client device to a user of a first client device;
   receiving at said first client device, said availability context indication of the second client device for receiving a voice on demand private message chat;
   selecting said second client device via a chat interface provided with said first client device,
   receiving an audio message input from a user of said first client device, and,
   transmitting said audio message to said second client device over a communications network; and, said second client device,
   receiving said transmitted audio message and storing said audio message; and,
   providing an indicator integrated with text received from said first client device via a chat interface of said second client device that said audio message has been received from said first client device; and,
   initiating playback of said audio message, wherein either said first or second client device is enabled to select either an audio reply enabling audio reply or a text response mode enabling textual message reply from a single client device in a single chat session, whereby voice and text communications are interleaved in a single chat session enabling playback of said audio message without interrupting a text chat session.

21. The method for voice chat as claimed in claim 20, further comprising the step of:
   providing a host computer device for
      i) determining availability status of said second chat client device for receiving a private message chat and providing an indication to a first client device as to the availability of said second chat client device to receive an audio input message; and,
      ii) receiving an audio message input from said first client device and transmitting said audio input message to said second chat client device.

22. A program storage device readable by a machine, tangibly embodying a program of instructions executable by the machine to perform method steps for enabling semi-synchronous voice message chat, said method steps for enabling voice message chat comprising:

indicating availability context of a user of a second client device to a user of a first client device;

receiving at said first client device, said availability context indication of the second client device for receiving a voice on demand private message chat;

selecting said second client device via a chat interface provided with said first client device, receiving an audio message input from a user of said first client device, and, transmitting said audio message to said second client device over a communications network; and, said second client device, receiving said transmitted audio message and storing said audio message; and, providing an indicator integrated with text received from said first client device via a chat interface of said second client device that said audio message has been received from said first client device; and, initiating playback of said audio message, wherein either said first or second client device is enabled to select either an audio reply enabling audio reply or a text response mode enabling textual message reply from a single client device in a single chat session, whereby voice and text communications are interleaved in a single chat session enabling playback of said audio message without interrupting a text chat session.

* * * * *